(12) United States Patent
Shuvenkov et al.

(10) Patent No.: US 12,512,486 B2
(45) Date of Patent: Dec. 30, 2025

(54) ELECTRIC POWER GENERATION SYSTEM BASED ON PRESSURIZED FUEL CELL POWER SYSTEM WITH AIR COOLING AND RECIRCULATION AND METHOD FOR ELECTRIC POWER GENERATION BY THE SYSTEM

(71) Applicant: ZeroAvia, Inc., Hollister, CA (US)

(72) Inventors: Sergei Shuvenkov, Moscow (RU); Aleksei Ivanenko, Moscow (RU); Sergei Nefedkin, Moscow (RU); Sergei Panov, Rybinsk (RU)

(73) Assignee: ZeroAvia, Inc., Hollister, CA (US)

( * ) Notice: Subject to any disclaimer, the term of this patent is extended or adjusted under 35 U.S.C. 154(b) by 709 days.

(21) Appl. No.: 17/759,106

(22) PCT Filed: Feb. 5, 2021

(86) PCT No.: PCT/US2021/016858
§ 371 (c)(1),
(2) Date: Jul. 20, 2022

(87) PCT Pub. No.: WO2021/158944
PCT Pub. Date: Aug. 12, 2021

(65) Prior Publication Data
US 2023/0039588 A1 Feb. 9, 2023

Related U.S. Application Data

(60) Provisional application No. 62/971,531, filed on Feb. 7, 2020.

(51) Int. Cl.
*H01M 8/04014* (2016.01)
*H01M 8/04007* (2016.01)
(Continued)

(52) U.S. Cl.
CPC ... *H01M 8/04014* (2013.01); *H01M 8/04074* (2013.01); *H01M 8/04111* (2013.01);
(Continued)

(58) Field of Classification Search
CPC ......... H01M 8/04074; H01M 8/04111; H01M 8/0441
See application file for complete search history.

(56) References Cited

U.S. PATENT DOCUMENTS 10,483,572 B2 * 11/2019 Naganuma ........ H01M 8/04253
2005/0008912 A1 1/2005 Yang et al.
(Continued)

FOREIGN PATENT DOCUMENTS

CN 115548404 A * 12/2020 ........ H01M 8/04082
KR 100837913 B1 6/2008
(Continued)

OTHER PUBLICATIONS

International Search Report for International Application No. PCT/US2021/016858 mailed Apr. 6, 2021.
(Continued)

*Primary Examiner* — Amanda C. Walke
(74) *Attorney, Agent, or Firm* — Osha Bergman Watanabe & Burton LLP

(57) ABSTRACT

An air pressure in fuel cells of an electric power generation system comprising a fuel cell stack (PCS) is raised with a pressurized air cooling system with recirculation to values at least two times greater than typical values for an PCS with air cooling. The FCS is either placed in a high-pressure chamber to which air is injected, or air outgoing from the FCS is redirected via a duct back to the FCS inlet and a portion of pressurized fresh air is added thereto. The chamber or the duct is provided with a radiator by means of which circulating air heat is transferred into the external environ-
(Continued)

ment. Air recirculation in the chamber or the duct is effected by means of fans for cooling fuel cells. Useful capacity of electric power generation systems based on fuel cells is raised significantly, the necessity of using a humidifier is excluded, and the temperature range of fuel cell operation is expanded.

20 Claims, 5 Drawing Sheets

(51) Int. Cl.
*H01M 8/04111* (2016.01)
*H01M 8/0432* (2016.01)
*H01M 8/0438* (2016.01)
*H01M 8/04537* (2016.01)
*H01M 8/04858* (2016.01)
*H05K 7/20* (2006.01)

(52) U.S. Cl.
CPC ..... *H01M 8/0435* (2013.01); *H01M 8/04373* (2013.01); *H01M 8/04425* (2013.01); *H01M 8/04559* (2013.01); *H01M 8/04589* (2013.01); *H01M 8/04947* (2013.01); *H05K 7/20154* (2013.01); *H05K 7/20172* (2013.01)

(56) References Cited

U.S. PATENT DOCUMENTS

| | | | |
|---|---|---|---|
| 2007/0287041 A1* | 12/2007 | Alp | H01M 8/04007 |
| | | | 429/444 |
| 2012/0214077 A1 | 8/2012 | Garrettson et al. | |
| 2014/0138060 A1* | 5/2014 | Noh | F28D 15/06 |
| | | | 165/104.26 |
| 2016/0133971 A1* | 5/2016 | Naganuma | H01M 8/04253 |
| | | | 429/434 |
| 2017/0004438 A1* | 1/2017 | Park | G06Q 10/06311 |
| 2018/0034087 A1 | 2/2018 | Watanabe et al. | |
| 2018/0166716 A1* | 6/2018 | Imanishi | H01M 8/04298 |
| 2019/0198895 A1 | 6/2019 | Morita et al. | |

FOREIGN PATENT DOCUMENTS

| | | | | |
|---|---|---|---|---|
| KR | 20170125225 A | 11/2017 | | |
| WO | 2016141085 A1 | 9/2016 | | |
| WO | WO-2024041702 A1 * | 2/2024 | ........... | B64D 27/355 |

OTHER PUBLICATIONS

Written Opinion for International Application No. PCT/US2021/016858 mailed Apr. 6, 2021.

* cited by examiner

|  |  | Air pressure, bars (abs) | | | | | | | | |
|---|---|---|---|---|---|---|---|---|---|---|
|  | Value | 2 | 3 | 4 | 5 | 6 | 7 | 8 | 9 | 10 |
| Flowrate, Stoichiometric coefficient — 1.5 | Power, kW | 2.57 | 3.46 | 4.20 | 4.81 | 5.33 | 5.76 | 6.13 | 6.44 | 6.71 |
| | Efficiency | 46.5% | 44.3% | 42.5% | 41.1% | 39.8% | 38.7% | 37.7% | 36.7% | 35.9% |
| 2.0 | Power, kW | 3.55 | 4.59 | 5.37 | 5.95 | 6.40 | 6.73 | 6.98 | 7.17 | 7.30 |
| | Efficiency | 45.4% | 42.4% | 40.1% | 38.2% | 36.5% | 35.0% | 33.6% | 32.4% | 31.2% |
| 2.5 | Power, kW | 4.02 | 5.03 | 5.72 | 6.18 | 6.49 | 6.67 | 6.77 | 6.80 | 6.77 |
| | Efficiency | 44.3% | 40.6% | 37.7% | 35.2% | 33.1% | 31.3% | 29.6% | 28.0% | 26.6% |
| 3.0 | Power, kW | 4.27 | 5.19 | 5.74 | 6.05 | 6.19 | 6.21 | 6.15 | 6.03 | 5.86 |
| | Efficiency | 43.2% | 38.8% | 35.3% | 32.3% | 29.8% | 27.5% | 25.5% | 23.7% | 21.9% |
| 3.5 | Power, kW | 4.39 | 5.19 | 5.59 | 5.73 | 5.71 | 5.57 | 5.35 | 5.07 | 4.75 |
| | Efficiency | 42.2% | 36.9% | 32.8% | 29.4% | 26.5% | 23.8% | 21.5% | 19.3% | 17.3% |

Fig. 5

ELECTRIC POWER GENERATION SYSTEM BASED ON PRESSURIZED FUEL CELL POWER SYSTEM WITH AIR COOLING AND RECIRCULATION AND METHOD FOR ELECTRIC POWER GENERATION BY THE SYSTEM

CROSS-REFERENCE TO RELATED APPLICATIONS

This application is national phase application under 35 U.S.C. § 371 of International Application No. PCT/US2021/016858 filed Feb. 5, 2021, which claims the benefit of and priority to U.S. Provisional Patent Application No. 62/971,531 filed Feb. 7, 2020, the contents of both of which being incorporated by reference in their entireties herein.

TECHNICAL FIELD

The present disclosure relates to the field of fuel cells and, in particular, to hydrogen-air fuel cells, and to methods of generating electric power by means of fuel cells.

BACKGROUND

It is known that fuel cell power systems (FCPS) comprising one or more fuel cell stacks (FCS) and their operation support system may be divided into FCPSs with air cooling and FCPSs with liquid cooling. The necessity of cooling is associated with the fact that heat is produced during an FCPS operation, which may cause overheating and degradation of FC components.

An FCPS with liquid cooling enables to cool FCSs more efficiently, and, due to supply of pressurized air involved into the respective electrochemical reaction, provides a greater specific power per unit volume. However, FCPSs with liquid cooling are characterized by a greater weight, since they require a more complex and heavier structure of single fuel cells and the presence of a cooling fluid circulation system, which is their disadvantage if they are used in transport.

FCPSs with air cooling (they are also called FCPSs with open cathode) are less heavy, and their structure is simpler than that of FCPSs with liquid cooling, which enables to achieve a high specific power per unit mass for a low-power FCPS. But they also have disadvantages, in particular they have a relatively low specific power per unit volume. This is associated with the fact that the FCPS capacity depends on partial pressure of reacting gases supplied to FCs, primarily air oxygen. In an FCS with air cooling, oxygen to FCs is supplied together with air under the ambient pressure, and besides the air is also used for cooling of FCs. In this case, it is impossible to separate a stream of air for cooling (i.e., cooling air) and a stream of air for the electrochemical reaction (i.e., reaction air). The capacity of an FCS may be increased by compressing the reaction air (i.e., by raising an oxygen partial pressure), but compression of cooling air requires significant energy expenditures and does not result in increasing an FCPS capacity. Meanwhile, it is required to supply tens to hundreds times more air for cooling than for the electrochemical reaction. For example, a stream of air going through an FCS producing 1 kW of electric energy may be from 15 to 90 normal liters per second, while only about 0.5 normal liter of air per second is required for oxidizing hydrogen. Taking into account that cooling air and reaction air is supplied as one stream, an increase in pressure of the reaction air, e.g. with the use of a compressor at an FCPS inlet, will result in the fact that energy expenditures for compressing air may exceed an energy benefit obtained from operating an FCPS owing to an increase of the reaction air pressure. For this reason, air is supplied into an FCS with air cooling (or with open cathode) under the ambient pressure. An operating temperature in an FC with air cooling is usually maintained in the range from +30 to +50° C., and air, while passing through such an FC, increases its temperature by 10-80° C. (an exact value depends on an incoming air temperature).

Conventional FCSs with air cooling are designed so as air can pass through them practically freely, i.e. almost without any gas-dynamic resistance, which enables to pass great volumes of air through at low energy expenditures. In order to pass air through FCSs with air cooling, low-pressure fans are used that are capable of supplying great volumes of air. Such fans consume little power, not more than 3-7% of a power produced by an FCS with air cooling.

In particular, Korean patent application KR20170125225 discloses an FC system comprising an FC stack, an air supply system with an air compressor, a hydrogen supply system, a humidifier, a heat exchanger, an air temperature sensor and a hydrogen temperature sensor. Compressed air and hydrogen are supplied to the FC stack. Air is used for carrying out the electrochemical reaction. This system enables to control an optimal air temperature when air is supplied to the FC stack. For this purpose, hot air pumped by the compressor is cooled in the heat exchanger by way of heat exchange with a cool stream of hydrogen. Additionally, air may be humidified in the humidifier in a case when dry and hot air is supplied to the compressor. A controller is used for sensing a hydrogen stream temperature and for controlling a valve that enables heat exchange between these streams.

An air temperature is required to be regulated and, in particular, at the initial stage of the FCPS operation. It is important, for example, for operation in cold conditions.

It is proposed in Korean application KR100837913 that fuel cells should be placed in a housing where supplied air can circulate. This enables to heat the fuel cells to the operating temperature quicker when operating them in cold conditions. An air stream is regulated by two flaps that open the channel surrounding the FCS in order hot air supplied by a compressor may pass through it.

The similar task is solved by published International Application WO2016141085, where an FC system comprises a damper. By rotating the damper, recirculation of air through the fuel cells is effected for the purpose of quicker heating the fuel cells and putting them into the operating mode.

According to U.S. Patent Publication No. 2005/0008912, fuel cells are also placed in a housing into which air is supplied, including air required for cooling. Recirculation of air within the housing and, additionally, its passing through a humidifier is provided.

Nevertheless, all the above-mentioned FC systems as well as other conventional systems are characterized by the disadvantage already mentioned, namely, either a relatively low (ambient) pressure of reaction air is used in systems with air cooling, which does not enable to raise an FC specific capacity to values comparable with those of an FCS with liquid cooling, or air compressing is combined with the use of a more complex liquid cooling system.

BRIEF SUMMARY

An electric power generation system based on fuel cells is described that is characterized by advantages of both FCPSs with air cooling and FCPSs with liquid cooling. In particular, an FCPS should be simple and reliable, and have a low weight as conventional FCPSs with air cooling. Moreover, an FCPS should provide a great power comparable to that generated in an FCPS with liquid cooling, due to an increased pressure of reaction gases.

Various embodiments are described herein to raise an air pressure in fuel cells of the electric power generation system to values at least two times greater than typical values for an FCPS with air cooling, such as from 2 to 10 bars. Furthermore, in order not to increase energy expenditures significantly for creating pressure at an FCS inlet, the FCS is either placed into a high-pressure chamber into which air is injected by means of an air pressurization module, or air outgoing from the FCS is redirected via a duct back to the FCS inlet with a partial addition of pressurized air from the pressurization module. Moreover, this chamber or duct is provided with a radiator by means of which circulating air heat is transferred into the external environment. Air in the chamber or the duct is recirculated for cooling FCs by means of fans usually used for cooling FCSs.

Furthermore, this chamber or duct is equipped with a controlled valve or damper to partially discharge air circulating in the chamber or the duct. It enables to substitute a portion of fresh air with a normal oxygen content for a portion of air with a reduced oxygen content which is spent for carrying out the electrochemical reaction, while maintaining a stable pressure within the chamber or the duct. On the other side, it would be sufficient that the air pressurization module may maintain a stable pressure at the chamber inlet or in the duct in order a portion of fresh air can fully compensate a volume of air discharged from the chamber or the duct via the valve or the damper.

The air pressurization module may comprise an air compressor or a sequence of several compressors and at least one radiator for cooling air heated due to its compression by the compressor. The compressor may change an air supply speed and outlet pressure. The compressor outlet pressure is controlled by a control module.

An FCS generates electric power due to electrochemical oxidation of hydrogen with air circulating through the FCS. The generated electric power is supplied to consumers and may be used for supplying power to the air pressurization module (in particular, for powering the compressor or the sequence of compressors), the control module and the fans. Simultaneously, the FCS produces heat that is removed by circulating air. Hydrogen is also supplied into the FCS under pressure equal to that in the chamber or the duct or exceeding it by a value in the range from 0.01 to 1 bar.

For the purpose of controlling the air supply and recirculation system temperature sensors may be installed at the air inlet of the air pressurization module, at the inlet of the chamber or the duct, at the FCS outlet; pressure sensors maybe installed at the compressor inlet and in the chamber or the duct; air flowrate sensors may be installed at the outlet of the chamber or the duct; sensors for measuring FCS output current and voltage may be also installed. Sensor data is sent to the control module that controls the capacity of the compressor or the sequence of compressors, the capacity of a fan unit, and the valve or the damper at the outlet of the chamber or the duct.

The air pressurization module and means providing air circulation maintain a ratio between a speed of air supply into the chamber or the duct and a speed of air circulation through the FCS in the range from 1:8 to 1:100.

Additionally, a method for electric power generation is described that can be realized by operating the electric power generation system and according to that an air high pressure is maintained in the area where the FCS is arranged, air circulation through the FCS is provided, hydrogen is supplied to the FCS, and partial discharge of circulating air is effected.

Hereinafter, various embodiments are explained in more detail with reference to the accompanying drawings.

BRIEF DESCRIPTION OF THE DRAWINGS

FIG. 5 shows a dependence of useful capacity of the electric power generation system on air pressure and flow-rate in the chamber or the duct.

DETAILED DESCRIPTION

Figure 1:
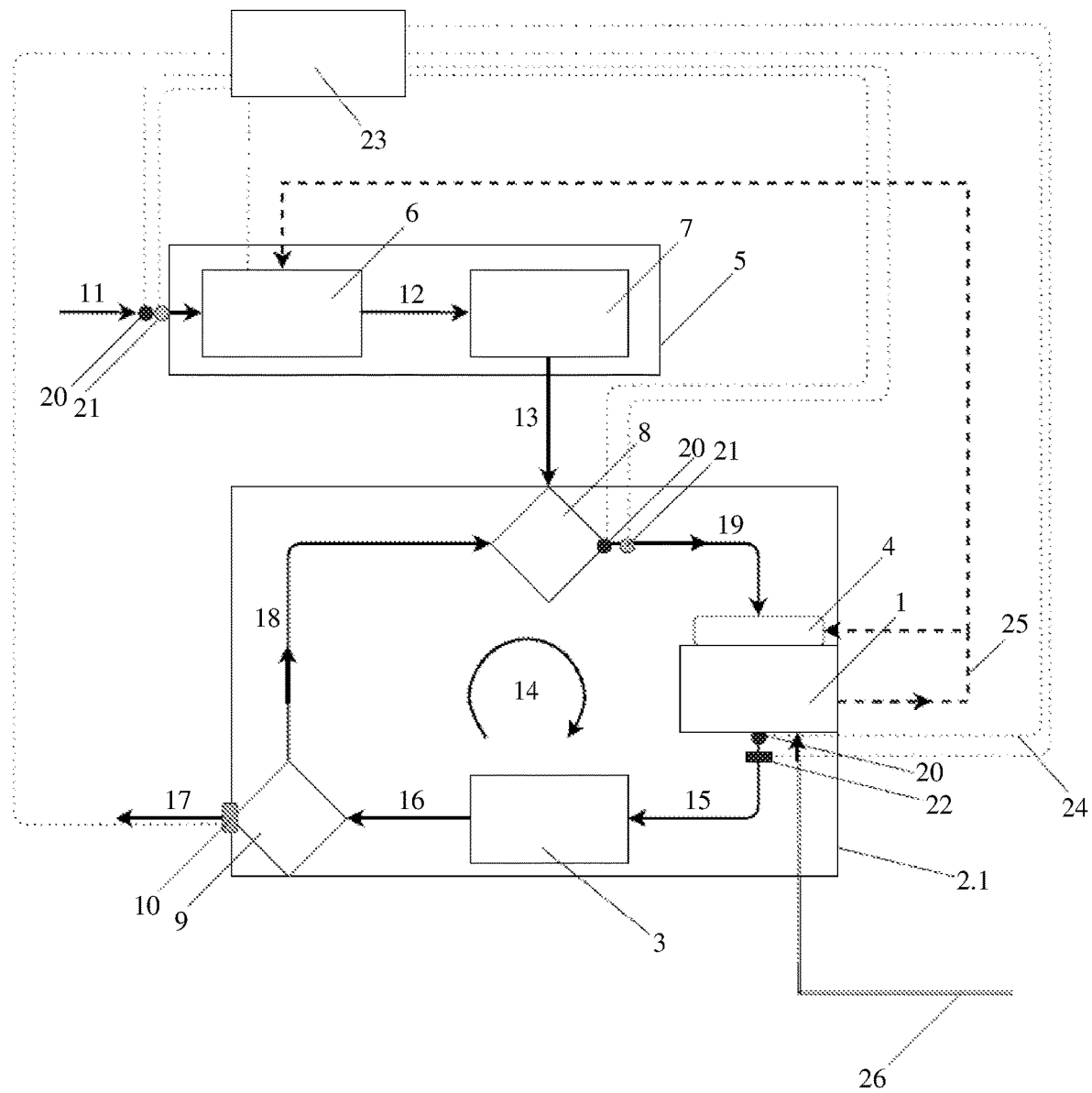
FIG. 1 shows a simplified layout of the claimed electric power generation system, wherein the FCS is placed in the high pressure chamber.

According to various embodiments, the electric power generation system comprises a fuel cell stack (FCS) 1 arranged in a high pressure chamber 2.1, as shown in FIG. 1. Also, the chamber 2.1 accommodates at least one radiator-heat exchanger 3 for air cooling.

The FCS 1 comprises one or more fuel cells (FC) and a fan unit 4 for the FCS. Any conventional polymer-membrane FCs may be used in the FCS 1.

The fan unit 4 is intended for forming a circulating air stream in the chamber 2.1; one or more fans or coolers, including those used in personal computers, may be provided therein.

A high air pressure, in particular in the range from 2 to 10 bars (abs), may be created in the chamber 2.1 by means of an air pressurization module 5. Correspondingly, the chamber 2.1 is made of any conventional material and has the structure and configuration so as to allow withstanding the pressures like this. In order to create a high pressure in the air pressurization module 5, a compressor 6, or, when necessary, a sequence of compressors 6, including a turbo-compressor similar to that used in a turbocharged internal combustion engine and utilizing energy of discharged air, may be used. Since air has an elevated temperature at the outlet of the compressor 6, the air pressurization module 5 may additionally comprise a radiator-heat exchanger 7.

Compressed and cooled pressurized air is supplied by the air pressurization module 5 to the inlet 8 of the chamber where, under the action of the fan unit 4, air circulation is effected. The air pressurization module 5 and the fan unit 4 provide the ratio between a speed of air supply into the chamber 2.1 and a speed of air circulation within the chamber 2.1 in the range from 1:8 to 1:100.

A valve 10 for partial discharge of air circulating in the chamber 2.1 is arranged at the outlet 9 of the chamber. A valve 10 may be a damper, throttle or any other conventional device suitable for controlled partial discharge of a pressurized gas. In particular, this is desirable that the valve 10 enables to effect controllable discharge of a pressurized gas equaling to 0.1-15% of an pressurized gas flow value in the chamber 2.1. If necessary, two or more valves 10 may be used.

The electric power generation system further comprises a hydrogen supply module (not shown in the Figures) for the FCS 1, for which any conventional means intended for supplying hydrogen to FCs within the FCS 1 maybe selected. For example, this maybe a hydrogen generator or a cylinder with hydrogen, which is equipped with an adjustable valve and, possibly, a hydrogen fdter, such as a palladium fdter. Hydrogen is supplied to the FCS 1 by the above module via the hydrogen supply line 26.

One example of operation of the electric power generation system is schematically shown in FIG. 1.

An inlet air stream 11 for supplying to the FCS 1 is taken from the environment and is compressed by the compressor 6 to a required value in the range from 2 to 10 bars (abs), while ensuring a required speed of its supply to the chamber 2.1. Before entering the chamber 2.1, a stream 12 of compressed air is passed through the radiator-heat exchanger 7 in order to cool it.

The compressed and cooled air stream 13 is supplied to the chamber 2.1 through a chamber inlet 8, and then a circulating stream 14 of pressurized air is created in the chamber 2.1 by means of the fan unit 4. The fan unit 4 may be installed in any place within the chamber 2.1, but, it may be arranged straight near the FCS 1, in particular at the inlet of the FCS 1, as shown in FIG. 1.

Under the effect of the electrochemical reaction in the FCS 1, an outgoing depleted hot air stream 15 has a lowered concentration of oxygen and an elevated temperature. Then, the stream 15 passes through the radiator-heat exchanger 3 for lowering its temperature; thus a depleted and cooled air stream 16 is formed at the outlet of the radiator-heat exchanger 3. The air stream 16 is discharged from the chamber outlet 9 by means of the valve 10 into the environment as a discharged stream 17, thus forming a low-pressure stream 18. A pressurized gas flow value of the stream 18 is restored to the required value after introducing a portion of air from the stream 13, so a cooled and oxygen-saturated air stream 19 is supplied to the inlet of the FCS 1 again.

A specific feature of this disclosure is that it uses air with a pressure that is significantly greater than a typical air pressure used in conventional FCS systems with air cooling. In particular, air pressures in the range from 2 to 10 bars (abs) may be used in the chamber. This forms a number of advantages over conventional systems and methods for electric power generation, but for this purpose changes should be introduced into structures of conventional FCSs.

In conventional FCPSs with air cooling, air passes through an FCS and is discharged into the environment, which, as it has been already said, does not enable to efficiently create an excess air pressure and increase useful capacity of an electric power generation system.

According to various embodiments of the present disclosure, air supplied into the chamber 2.1 remains within the chamber 2.1 to a substantial degree, which enables to use a pressure that is two or more times higher than typical pressures in FCPSs with air cooling. However, as it has been already said, when the electrochemical reaction goes on in the FCS 1, a portion of oxygen contained in the air stream 19 is spent, and the air stream 15 with a low oxygen content exits from the FCS 1. If this process would continue without any changes, an oxygen concentration in the circulating air stream 14 might be reduced to values at which the operating efficiency of the electric power generation system would be significantly lower. Understandably, no such problem may arise in conventional FSPSs with air cooling.

In order to avoid this unwanted situation, the present disclosure proposes to partially remove (discharge) air from the chamber 2.1 by means of the valve 10. As experiments show, it is sufficient to discharge an amount of air equal to 1.5-3.5 times the stoichiometric flowrate of air used for the electrochemical reaction from the chamber 2.1. On one side, this will not lead to significant energy expenditures for operating the air pressurization module 5 in order to maintain a preset operating value of air pressure in the chamber 2.1. On the other side, due to air recirculation, an oxygen percentage of air supplied to the inlet of the FCS 1 will be reduced. However, due to an increase in the air pressure in the chamber 2.1, an oxygen partial pressure will be increased also, and useful capacity provided by the electric power generation system will be increased.

Consequently, it is possible to increase an air operating pressure in the chamber 2.1 significantly, which will immediately lead to an increase in the capacity of the claimed electric power generation system. We have found that an air operating pressure in the chamber 2.1 may be increased to a value in the range from 2 to 10 bars, a desirable air operating pressure being in the range from 2.5 to 7 bars.

Tests also show that the best results from the points of air circulation in the chamber 2.1, heat exchange by means of radiators-heat exchangers 3 and an oxygen concentration in the chamber 2.1 are achieved when the ratio between a speed of air supply to the chamber 2.1 and a speed of air circulation within the chamber 2.1 is from 1:8 to 1:100.

One more advantage of this disclosure over conventional FCPSs with air cooling is the absence of the necessity to use a humidifier to prevent fuel cells from overdrying and raise an operating temperature.

Since the claimed electric power generation system does not provide for through passage of essentially all stream 13 supplied into the chamber 2.1, but only a portion of air (stream 17) is discharged, the condensate formed during operation is removed from the chamber 2.1 only in part, e.g., via the valve 10 or an additional condensate removal port (not shown in Figures). Such a system will produce much (multiply) more water than is removed from the chamber 2.1 in the form of steam when air is discharged via the valve 10. Correspondingly, a portion of moisture will be condensed on the radiator-heat exchanger 3, and water will be always present in the chamber 2.1 due to circulation, thus ensuring practically 100% humidity of circulating air. Since a portion of air added to the chamber 2.1 is small, and added air has a humidity close or equal to 100% (due to compression for achieving a high pressure), humid air is always supplied to the FC inlets in the FCS 1, thus preventing FCs from overdrying without the necessity of using any additional means like a humidifier.

Bearing this advantage in mind, an operating temperature of the FCS 1 may be increased by 10-20° C. in comparison with conventional FCPSs with air cooling, i.e., up to app. 50-70° C., which will lead to better heat removal from FCs and an additional increase in their capacity. Furthermore, air recirculation with introduction of a small portion of external air enables to maintain a temperature in the chamber 2.1 in a relatively narrow temperature range, irrespective of an ambient temperature. The claimed electric power generation system also enables to operate it at very cold temperatures. Thus, this disclosure expands the operating temperature range for an electric power generation system based on FCs both toward higher temperatures and toward lower temperatures.

Figure 2:
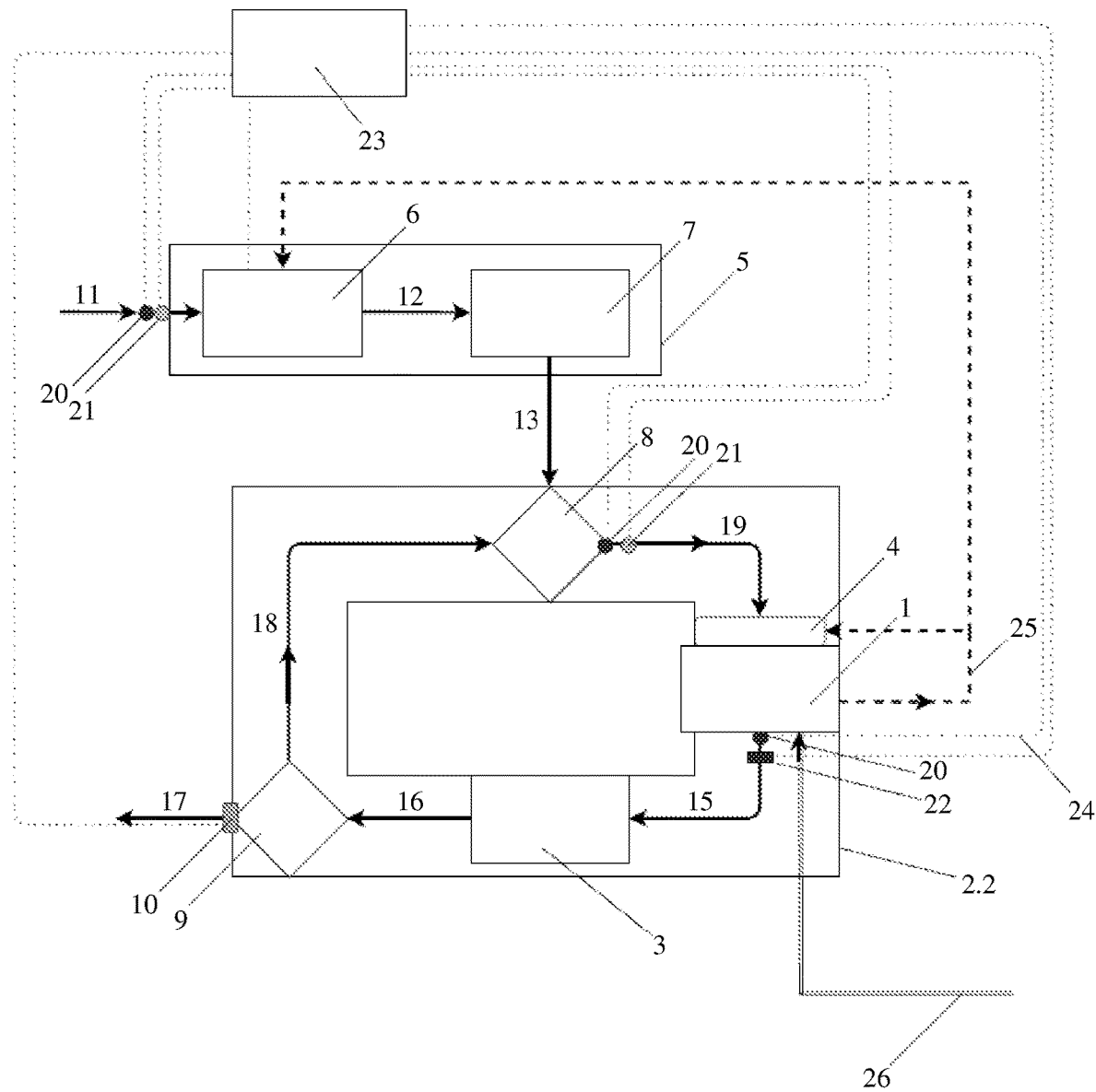
FIG. 2 shows a simplified layout of the claimed electric power generation system, wherein the FCS is placed in the high pressure duct.

Another exemplary embodiment of the claimed electric power generation system is shown in FIG. 2, according to which a duct 2.2 is used in the system instead of the chamber 2.1. The duct 2.2 connects the inlet and the outlet of the FCS 1, so a cooled air stream 19 saturated with oxygen is supplied to the inlet of the FCS 1, such as through the fan unit 4 installed upstream of it, and a depleted hot air stream 15 outgoing from the FCS 1 is again supplied into the duct 2.2.

The further movement of air in the duct 2.2 is quite similar to that described above with reference to the chamber 2.1. A person skilled in the art will understand that the fan unit 4 may be arranged and/or at the outlet of the FCS 1, if necessary, which will also maintain air circulation in the chamber 2.1 or in the duct 2.2.

Understandably, all the advantages of the embodiment of the electric power generation system comprising the chamber 2.1 will exist in the second embodiment of the disclosure wherein the duct 2.2 is used.

In various embodiments of the present disclosure, the electric power generation system according to any of its variants (FIGS. 1, 2) may comprise the following components for controlling its operation: pressure sensors 20, temperature sensors 21, a current and voltage sensor 22, and an air flowrate sensor (not shown in the Figures). In particular, the pressure sensors 20 measure a pressure of an inlet stream 11, a compressed and cooled stream 13, and a depleted hot stream 15. The temperature sensors 21 are intended for measuring a temperature of the inlet stream 11 and the depleted hot stream 15. The current and voltage sensor 22 is intended for measuring an output current and voltage of the FCS 1. An air flowrate sensor may be installed at the outlet of the chamber 2.1 or the duct 2.2.

Data from these sensors are sent to the control module 23 via the control lines 24. The control module 23 controls the capacity of the compressor 6 or a sequence of the compressors 6, the capacity of the fan unit 4, the valve 10 in order to maintain required parameters and operation modes of the electric power generation system.

Electric power generated by the claimed system may be supplied to consumers and may be also used for powering the system components, such as the air pressurization module 5 (in particular for powering the compressor 6 or the sequence of the compressors 6), the control module 23, the fan unit 4, via an electric power supply line 25.

As it has been discussed above, the electric power generation system comprises a hydrogen supply module (not shown in the Figures) for the FCS 1, and hydrogen is supplied from this module to the FCS 1 via a hydrogen supply line 26.

EXAMPLE

On the basis of experimental data for a single fuel cell, characteristics of the electric power generation system, as described above, were calculated for the following parameters and modes:
FSC nominal capacity (without a pressurized air cooling system): 3.5 kW;
absolute pressure after the compressor 6 and in the chamber 2.1 (duct 2.2): 2-10 bars;
air temperature in the chamber 2.1 (duct 2.2) before the FCS 1: 30-40° C.;
air temperature in the chamber 2.1 (duct 2.2) after the FCS 1: 45-65° C.;
oxygen percentage in air within the chamber 2.1 (duct 2.2): 10-18%;
voltage of a single cell (FC): 650 mV;
speed of air supply into the chamber 2.1 (duct 2.2): 3.7-23 L/s (stoichiometric coefficient for air—1.5-3.5);
efficiency of the compressor 6: 80-90%; and
ratio between a speed of air supply into the chamber 2.1 (duct 2.2) and a speed of air circulation within the chamber 2.1 (duct 2.2): from 1:8 to 1:100.

When varying air flowrate and pressure in the chamber 2.1 (duct 2.2), the calculated useful capacity of the system (capacity of the FCS 1 minus energy expenditures for air compression and circulation) is varied in the range from 3.5 to 7.3 kW.

Figure 3:
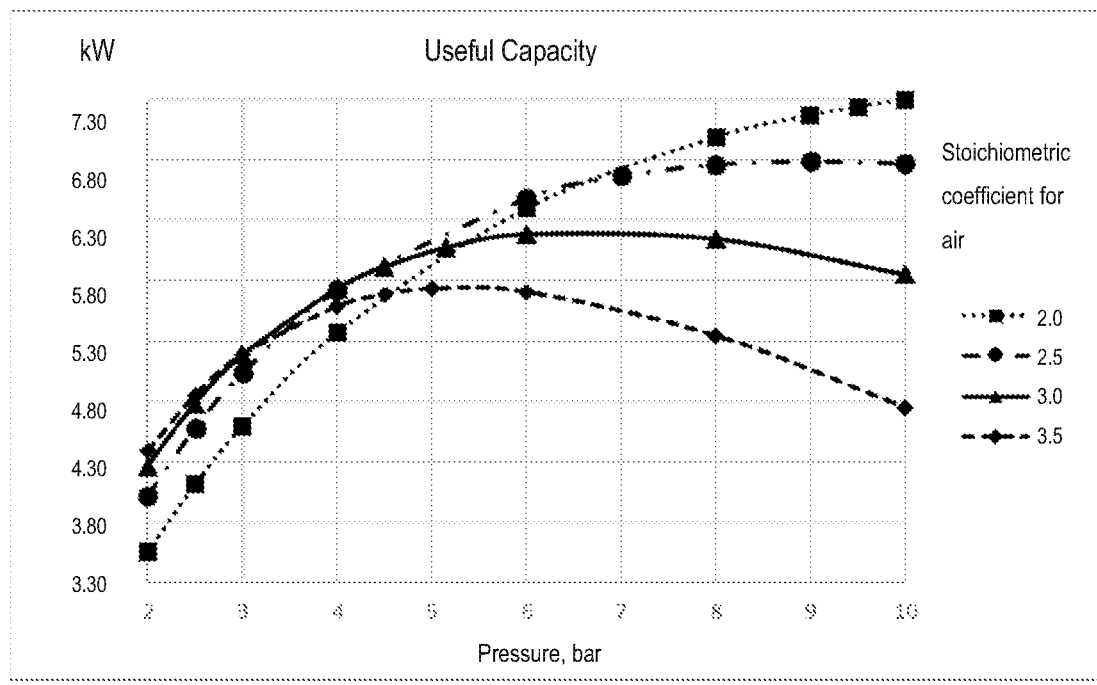
FIG. 3 shows a dependence of useful capacity of the electric power generation system on pressure at different air flow rates.

FIG. 3 shows a dependence of the calculated useful capacity of the claimed electric power generation system on a pressure in the chamber 2.1 (duct 2.2) at different air flow rates.

Figure 4:
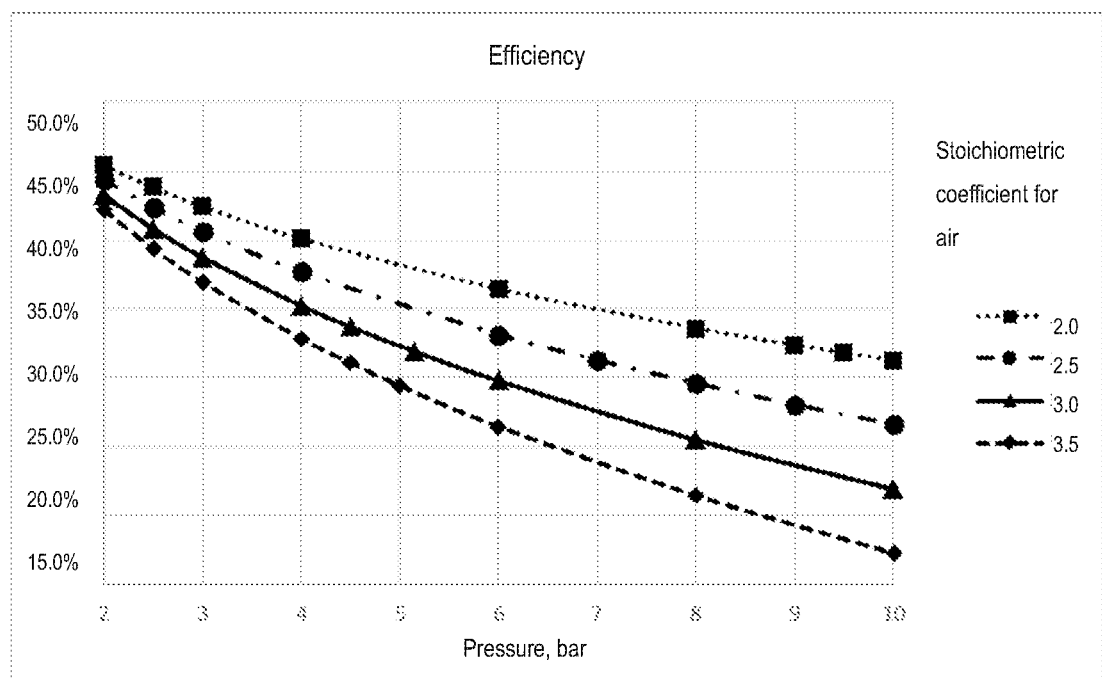
FIG. 4 shows a dependence of efficiency of the electric power generation system on pressure at different air flow rates.

FIG. 4 shows a dependence of the calculated efficiency of the claimed electric power generation system on an air pressure in the chamber 2.1 (duct 2.2) at various air flow rates.

FIG. 5 shows the calculated values of the useful capacity and the efficiency of the claimed electric power generation system, depending on a pressure in the chamber 2.1 (duct 2.2) and on an air flow rate.

A relative air flowrate value, which is equal to the definite stoichiometric coefficient for the preset total power of the FCS, was fixed in calculations, rather than an absolute air flowrate value.

The modeling results show that, at a small air flowrate equal to two stoichiometric flow rates, it is possible to increase the system useful capacity more than two times by creating the air pressure of 10 bars in the chamber 2.1 (duct 2.2) and supplying hydrogen under the same pressure. The percentage of oxygen in the chamber 2.1 (duct 2.2) was 10.5%. The hydrogen flow rate was 2.34 normal L/s, the speed of supplying air into the chamber 2.1 (duct 2.2) was 6.7 normal L/s, the air circulation speed was 300 normal L/s.

The total electric capacity of the FCS 1 was 12.25 kW, the useful electric capacity (minus expenditures for air compression and circulation) was 7.30 kW.

The total efficiency of the system was 31%, taking into account the capacity spent for compression and supply of air into the chamber 2.1 (duct 2.2), as equaling to 4.34 kW, and for air circulation in the chamber 2.1 (duct 2.2), as equaling to 0.61 kW.

Thus, the present disclosure and the embodiments described therein significantly increase a useful capacity of electric power generation systems based on FCs, in particular polymer FCs, without extra costs, and exclude the necessity of using a humidifier, while expanding a temperature range of fuel cell operation.

What is claimed is:

1. An electric power generation system, comprising:
a fuel cell stack (FCS);
a duct with its one end connected to an FCS inlet and its other end connected to an FCS outlet;
a fan unit arranged in the duct for maintaining air circulation in the duct, and at least one radiator-heat exchanger;
an air pressurization module for the duct;
a hydrogen supply module for the FCS; and
at least one valve arranged on the duct, wherein the duct is configured to controllably allow partial discharge of air pressure in the duct.

2. The system according to claim 1, wherein the air pressurization module and the at least one valve are configured to provide and maintain an absolute air pressure in a range from 2 to 10 bars in the duct.

3. The system according to claim 2, wherein said at least one valve is configured to relieve pressurized air flow by a value in the range from 0.1 to 15% of circulating air flow in the duct.

4. The system according to claim 1, wherein the air pressurization module comprises a compressor or a sequence of compressors.

5. The system according to claim 4, wherein the air pressurization module comprises at least one radiator-heat exchanger.

6. The system according to claim 1, wherein the pressurization module and the fan unit are configured to maintain a ratio between a speed of air supply into the duct and a speed of air circulation within the duct in a range from 1:8 to 1:100.

7. The system according to claim 1, wherein a hydrogen pressure is equal to, or higher by 0.01-1 bar than, an air pressure.

8. The system according to claim 1, further comprising at least one of:
   temperature sensors at an air inlet of the air pressurization module, at a duct inlet and at an outlet from the FCS;
   pressure sensors at an inlet into the air pressurization module and inside the duct;
   an air flow rate sensor at an outlet from the duct; and
   an output current and voltage sensor for the FCS, the system further comprising a control module for receiving data from the sensors and controlling at least one of: a capacity of a compressor or a sequence of compressors, the capacity of the fan unit, and the valve.

9. A method for electric power generation, comprising:
   providing a fuel cell stack (FCS);
   providing a duct with its one end connected to an FCS inlet and its other end connected to an FCS outlet;
   providing a fan unit arranged in the duct configured to maintain air circulation in the duct, the fan unit comprising at least one radiator-heat exchanger;
   providing a high pressure of air and hydrogen in an area where the FCS is provided;
   providing the air circulation in the area where the FCS is provided and through the FCS itself;
   partially relieving pressure of air by passing the air through the FCS; and
   supplying fresh air to maintain a preset value of air pressure.

10. The method according to claim 9, wherein air pressure is in a range from 2 to 10 bars.

11. The method according to claim 10, wherein a partial relief of pressure is in the range from 0.1 to 15% of the air pressure value.

12. The method according to claim 9, wherein a ratio between a speed of air supply and a speed of air circulation is in a range from 1:8 to 1:100.

13. An electric power generation system, comprising:
   a fuel cell stack (FCS);
   a duct having a first end connected to an FCS inlet and a second end opposite the first end connected to an FCS outlet;
   a fan unit arranged in the duct configured to maintain air circulation in the duct, the fan unit comprising at least one radiator-heat exchanger;
   an air pressurization device for the duct;
   a hydrogen supply device for the FCS; and
   at least one valve arranged on the duct, wherein the duct is configured to controllably allow partial discharge of air pressure in the duct.

14. The system according to claim 13, wherein the air pressurization device and the at least one valve are configured to provide and maintain an absolute air pressure in a range from 2 to 10 bars in the duct.

15. The system according to claim 14, wherein the at least one valve is configured to relieve pressurized air flow by a value in the range from 0.1 to 15% of circulating air flow in the duct.

16. The system according to claim 13, wherein the air pressurization device comprises a compressor or a sequence of compressors.

17. The system according to claim 16, wherein the air pressurization device comprises at least one radiator-heat exchanger.

18. The system according to claim 13, wherein the air pressurization device and the fan unit are configured to maintain a ratio between a speed of air supply into the duct and a speed of air circulation within the duct in a range from 1:8 to 1:100.

19. The system according to claim 13, wherein a hydrogen pressure is equal to, or higher by 0.01-1 bar than, an air pressure.

20. The system according to claim 13, further comprising at least one of:
   temperature sensors at an air inlet of the air pressurization device, at a duct inlet, and at an outlet from the FCS;
   pressure sensors at an inlet into the air pressurization device and inside the duct;
   an air flow rate sensor at an outlet from the duct; and
   an output current and voltage sensor for the FCS, wherein the system further comprises a controller for receiving data from the sensors and controlling at least one of: a capacity of a compressor or a sequence of compressors, the capacity of the fan unit, and the valve.

* * * * *